UNITED STATES PATENT OFFICE.

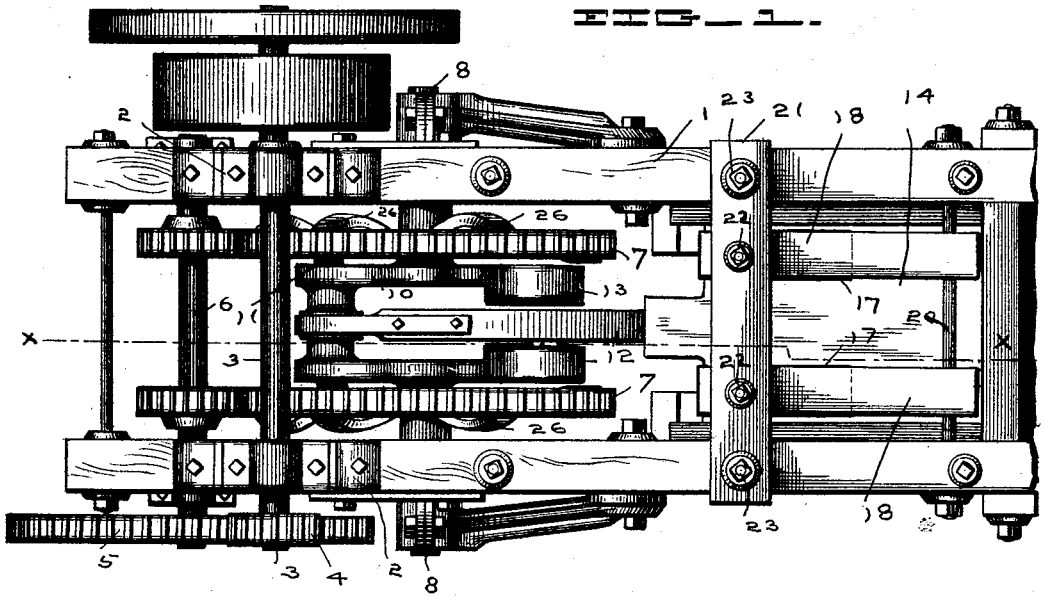

JESSE B. JOHNSON AND JOSEPH R. JOHNSON, OF INDIANAPOLIS, INDIANA.

BALING-PRESS.

SPECIFICATION forming part of Letters Patent No. 480,771, dated August 16, 1892.

Application filed November 16, 1891. Serial No. 412,100. (No model.)

*To all whom it may concern:*

Be it known that we, JESSE B. JOHNSON and JOSEPH R. JOHNSON, of Indianapolis, county of Marion, and State of Indiana, have invented certain new and useful Improvements in Baling-Presses; and we do hereby declare that the following is a full, clear, and exact description thereof, reference being had to the accompanying drawings, in which like figures refer to like parts.

Our invention relates to improvements in the construction of presses for baling hay and other loose material, wherein a rebounding plunger is used, and is an improvement on the press shown in Letters Patent No. 452,755, issued to J. R. Johnson May 19, 1891, and in an application filed by J. B. Johnson May 4, 1891, Serial No. 391,444, and allowed July 28, 1891, and will be understood from the following description.

In the drawings, Figure 1 is a top view of the press; and Fig. 2 is a longitudinal section on the line $x$ $x$, Fig. 1.

In detail, 1 is the framework of the press, having boxings 2, in which is mounted the shaft 3, carrying the driving-pulley and fly-wheel.

4 is a small gear wheel or pinion mounted on the opposite end of the shaft, engaging with a large gear-wheel 5, mounted on the counter-shaft 6, this counter-shaft also carrying pinions which engage with the gear-wheels 7, loosely mounted on the short axles 8, supported in boxings secured to the frame 1, the spokes in each wheel being curved outward near their ends at 26, except one, which is straight and has a notch 9.

10 are cranks keyed on the inner ends of the axles 8, and 11 is a wrist which passes through openings in their ends, the cranks having extensions, each with a weighted end 13 to counterbalance the weight of the cranks and the plunger-bar 12, whose end is attached directly to the central part of this wrist 11.

14 is the plunger, which works on the floor or sill 15 of the press, and to its back is bolted a bracket 16, connected with which is the end of the plunger-bar 12.

17 are flat metal pieces firmly attached to the top of the plunger-frame, their faces being on a slight angle. The brake is formed of two blocks or bars 18, which also have flat metal pieces 19 secured to their outer ends, a rod 20 passing through their opposite ends and also through the framework 1, where it is held in place by nuts.

21 is a cross-piece directly above the ends of the bars 18, and through this piece bolts 22 are loosely passed and also through the ends of the brake-bars 18, a thimble and suitable washers being interposed between the bars 18 and 21.

23 are bolts passing loosely through the ends of the cross-bar 21 and also through the side pieces of the framework, with a spring 24 coiled around their lower ends beneath the side pieces and a washer and nut on the end, holding all the parts in place. The object of this brake is that where very heavy material is being pressed or where a bale of great density is desired the plunger in rebounding from the bale when the ends of the crank-wrist 11 are released from the notches 9 in the spokes of the gear-wheels the force of the rebound is so great that the cranks 10 have a tendency to be carried around above a horizontal line and sometimes make nearly a complete revolution, at the same time carrying the plunger back and partly filling the baling-chamber. With our improved device this is overcome, for as the plunger rebounds from the bale the plates 17 on the top of the plunger-frame come in contact with the plates 19 on the brake-bars 18, and, inasmuch as the friction between them will constantly increase, the plunger is brought to a standstill about the time that its bar reaches a horizontal line and is held there until the notches 9 engage with the crank-wrist and carry the plunger-bar around and forward. By means of the nuts on the bolts 23 the tension of the coiled springs 24 may be increased or decreased, so that whatever kind of material is being pressed the friction of the brake can be adjusted to correspond, as where loose bales are being made the rebound of the plunger is not sufficient to cause the wrist 11 to be carried above a horizontal line. The weights 13 on the ends of the cranks 10 are for the purpose of balancing the same, so that when the plunger rebounds there will be no wrenching or jerking, as the weighted ends exactly counterbalance the plunger-bar.

What we claim as our invention, and desire to secure by Letters Patent, is the following:

1. In a baling-press, an elastic-brake mechanism consisting of brake-blocks pivotally connected to the framework above the plunger, the outer ends of such blocks connected to a cross-bar through whose outer ends and the framework pass bolts with springs coiled on their lower ends, and nuts for retaining the same, whereby the tension of the springs is exerted to hold the blocks in contact with the plunger as it rebounds, substantially as shown and described.

2. In a baling-press, a rebounding plunger, means for actuating the same, a supporting framework, brake-blocks pivoted to such frame above the plunger and contacting therewith as the latter rebounds, the bearing parts protected by metal friction-plates so set as to present inclined faces, the outer ends of the brake-blocks connected to a cross-bar, the ends of such cross-bar connected to the framework by suitable bolts, on the lower end of which springs are coiled and adapted to be tensioned by nuts on the ends of such bolts, substantially as shown and described.

3. In a baling-press, a framework, a rebounding plunger, operating connections thereto, the cranks provided with counterweights upon their free ends for balancing the weight of the cranks and plunger-bar, and an adjustable friction-brake mechanism pivotally connected to the framework above the plunger, all combined substantially as shown and described.

In witness whereof we have hereunto set our hands this 7th day of November, 1891.

J. B. JOHNSON.
JOSEPH R. JOHNSON.

Witnesses:
E. B. GRIFFITH,
H. D. NEALY.